United States Patent [19]
Nishimura

[11] Patent Number: 5,942,877
[45] Date of Patent: Aug. 24, 1999

[54] PORTABLE INFORMATION DEVICE AND CHARGER THEREFOR

[75] Inventor: Kiyoshi Nishimura, Kyoto, Japan

[73] Assignee: Rohm Co., Ltd., Kyoto, Japan

[21] Appl. No.: 08/789,420

[22] Filed: Jan. 29, 1997

[30] Foreign Application Priority Data

Feb. 23, 1996 [JP] Japan ..................................... 8-036931

[51] Int. Cl.⁶ ....................................................... H02J 7/00
[52] U.S. Cl. ........................... 320/112; 320/114; 320/137
[58] Field of Search ................................... 320/106, 107, 320/112, 113, 114, 115, 155, 127, 128, 133, 137; 429/7, 8, 90, 61

[56] References Cited

U.S. PATENT DOCUMENTS

| | | | |
|---|---|---|---|
| 5,357,492 | 10/1994 | Sagane | 368/204 |
| 5,537,106 | 7/1996 | Mitsuhashi | 340/825 |
| 5,561,712 | 10/1996 | Nishihara | 379/355 |
| 5,600,711 | 2/1997 | Yuen | 379/102 |
| 5,677,895 | 10/1997 | Mankovitz | 368/10 |
| 5,754,029 | 5/1998 | Mann et al. | 320/106 |
| 5,777,399 | 7/1998 | Shibuya | 320/137 |

*Primary Examiner*—Peter S. Wong
*Assistant Examiner*—K. Shin
*Attorney, Agent, or Firm*—Majestic, Parsons, Siebert & Hsue P.C.

[57] ABSTRACT

A portable information device includes a portable main part having a clocking function, a source part which is detachably attachable to the main part and contains secondary batteries serving as a power source for the main part, and a charger which is separate from the main part and serves to charge the source part. The charger includes a clock part for setting time, and the information device is adapted to cause time data from the clock part to be transmitted to the source part when the source part is charged by the charger and, when the source part is attached to the main part, to transmit time data updated by the source part to the main part and to thereafter cause the main part to continue updating the time data.

15 Claims, 3 Drawing Sheets

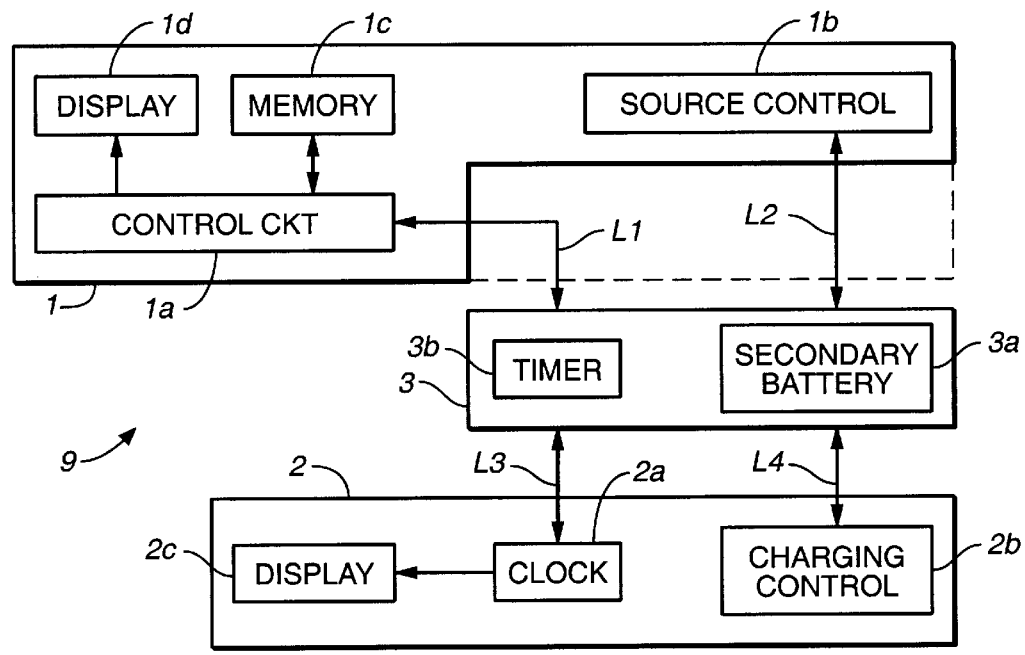
FIG._1
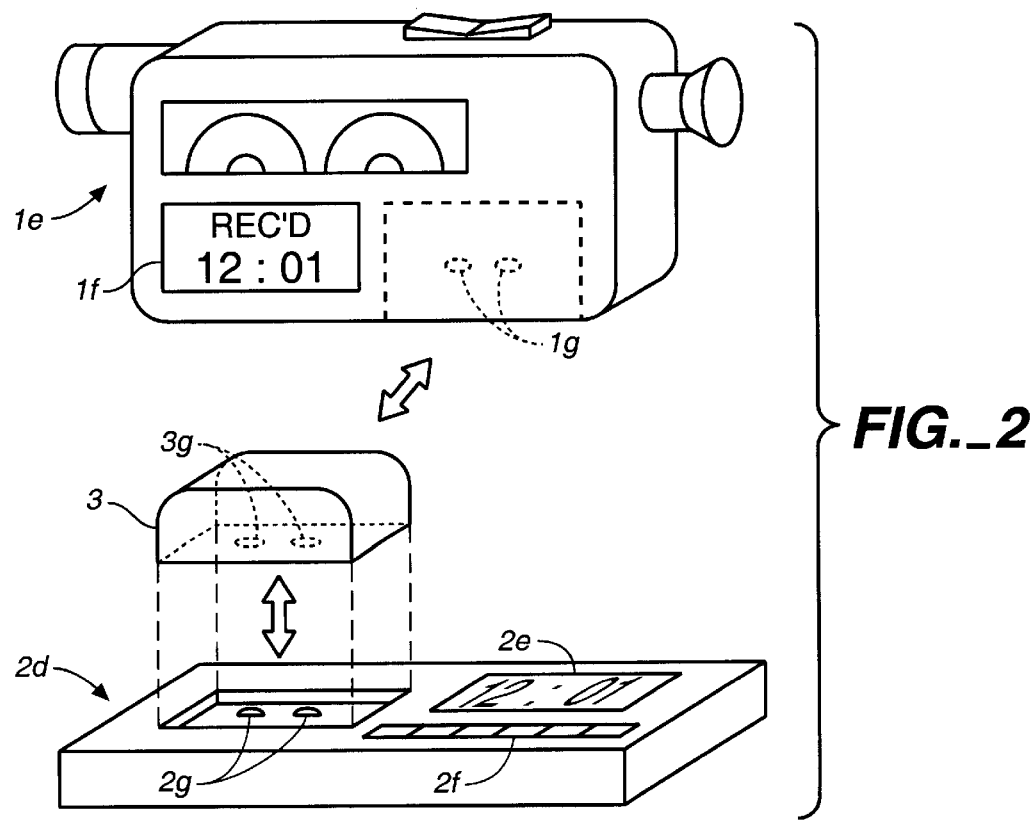
FIG._2

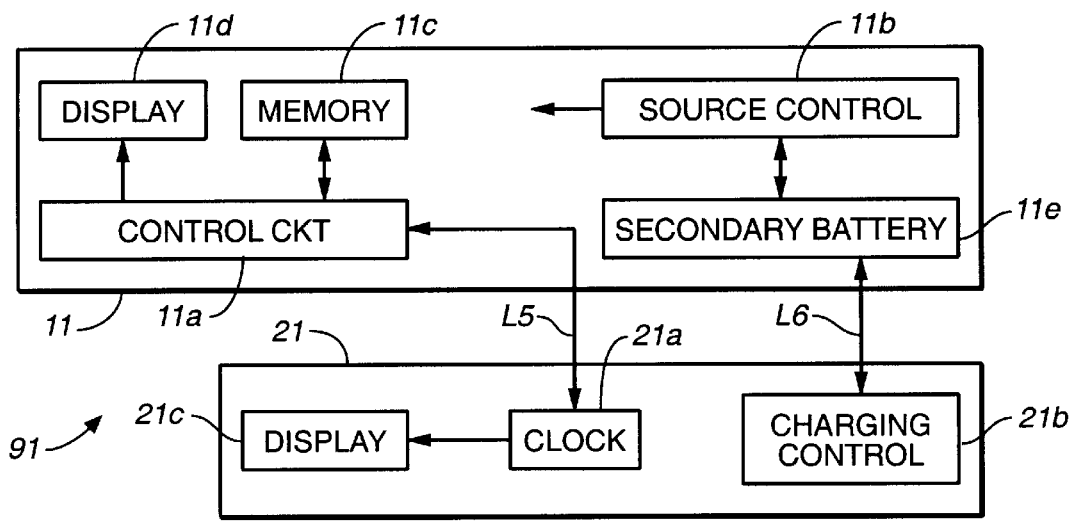
FIG._3
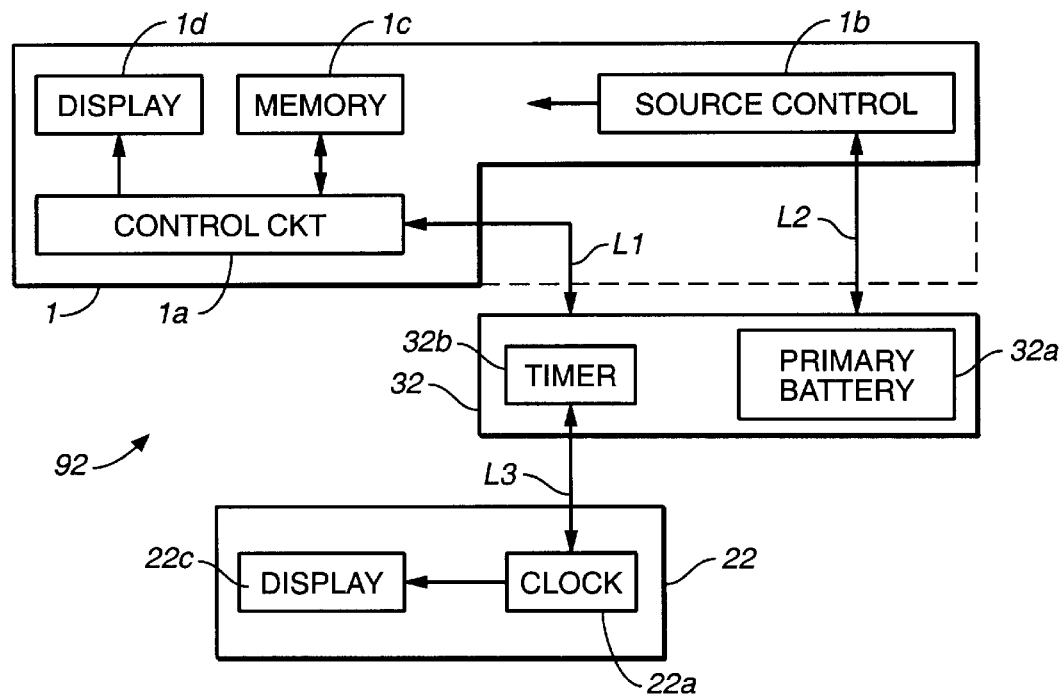
FIG._4

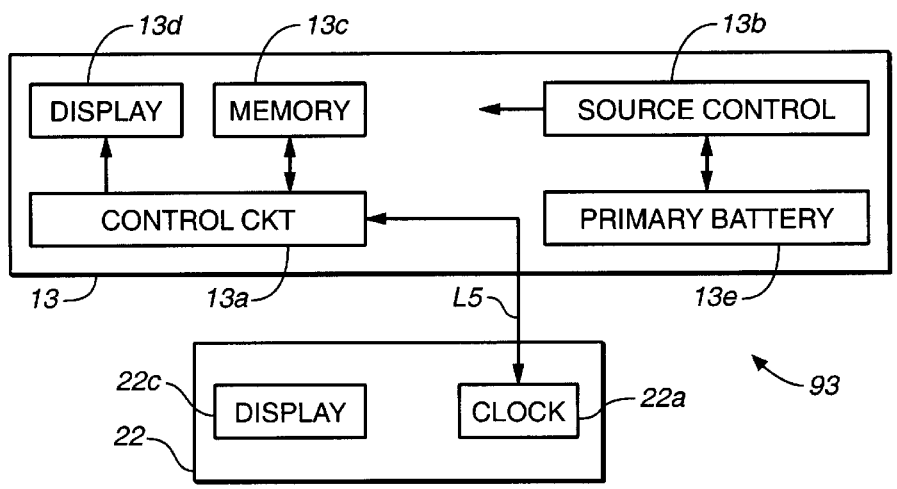
FIG._5
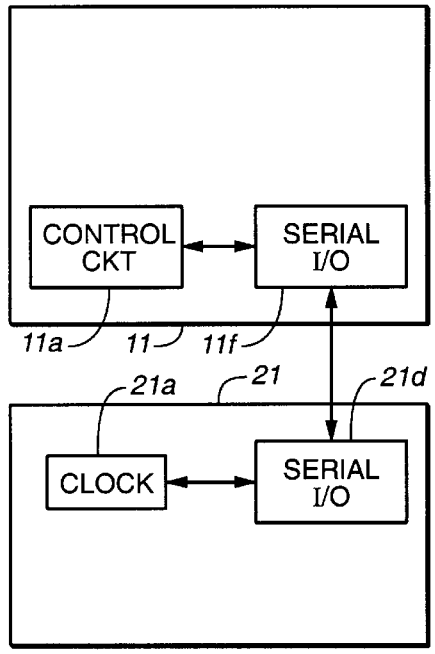
FIG._6
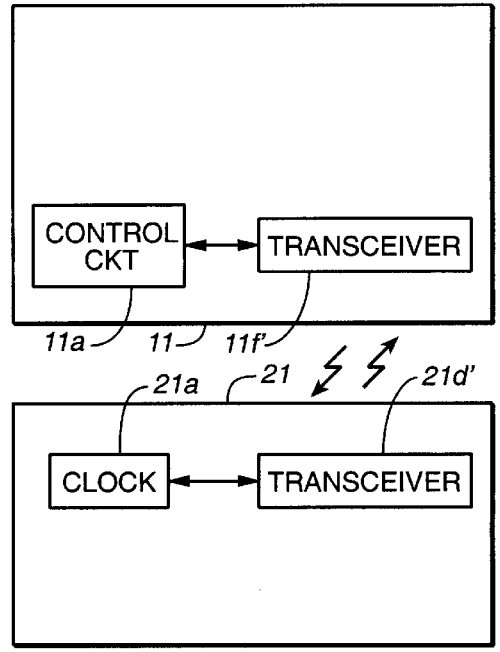
FIG._7

PORTABLE INFORMATION DEVICE AND CHARGER THEREFOR

BACKGROUND OF THE INVENTION

This invention relates to a portable information device such as a portable telephone, a personal computer notebooks, a personal digital assistant (PDA) and a VTR camera, as well as a charger for such a device. More particularly, this invention relates to the system structure for setting time information easily for the main part of such a portable information device.

Information devices, such as personal computers, generally manage data by attaching time information such as time and date to different kinds of data and by taking into consideration the age of each data item. For the same reason, portable information devices of the kind described above having a clock function are also adapted to carry out data management by attaching time information to each data item, having, in addition to a main battery, a backup battery for the semiconductor memory such as an SRAM or an auxiliary battery for the clock such that data maintenance and continuous operation of the clock function can be carried out even when the main battery serving as the power source of the device is being exchanged or the source voltage of the main battery has dropped below the level of the action voltage.

Many of more recent portable information devices now use a non-volatile semiconductor memory (herein referred to simply as "non-volatile memory"), such as FLASH and FRAM, that does not require a backup battery, but an auxiliary battery for a watch is used for the sole purpose of continuously carrying out its clocking operation. It now goes without saying that it is desirable to make portable devices as compact as possible. Since a smaller device means a smaller space inside its housing, there has been a strong desire to do away with an auxiliary battery, if possible.

In practice, however, auxiliary batteries could not be dispensed with because, if the auxiliary battery is taken away from a portable information device having a clock function, the clocking operation will be stopped with an error introduced into the time information when, for example, the main battery is exchanged or there is an over-discharge such that the source voltage drops below the operational voltage. Thus, the time information will have to be reset after each recovery of the source voltage, say, after the main battery has been exchanged, but portable information devices are usually not provided with a switch dedicated to the setting of the clock because their housing is designed to be as compact as possible. This means that the resetting of the clock must be done by sharing a switch for some other purpose, and the user will be required to go through a series of complicated operations which are difficult to understand and cumbersome to carry out.

SUMMARY OF THE INVENTION

It is therefore an object of this invention to provide a portable information device with a clock function which, having no auxiliary battery for continuing its clocking operation, does not require the time information stored in its main part to be manually reset whenever the main battery serving as the power source for the main part is exchanged.

It is another object of this invention to provide a charger for such a portable information device.

A portable information device embodying this invention, with which the above and other objects can be accomplished, may be characterized as comprising a portable main part having a clocking function, a source part which is detachably attachable to the main part and contains secondary batteries serving as a power source for the main part, and a charger which is separate from the main part and serves to charge the source part. The charger includes a clock part for setting time, and the information device is adapted to cause time data from the clock part to be transmitted to the source part when the source part is charged by the charger and, when the source part is attached to the main part, to transmit time data updated by the source part to the main part and to thereafter cause the main part to continue updating the time data.

Another kind of portable information device according to this invention may be characterized as comprising a portable main part with a clocking function, containing a source part having rechargeable secondary batteries and a charger which is separate from the main part and serves to charge the source part. The charger includes a clock part for setting time, and the information device is adapted to cause time data from the clock part to be transmitted to the main part when the source part in the main part is charged by the charger, and to thereafter cause the main part to continue updating the time data.

This invention also relates to portable information devices using, instead of a charger of the kind described above, what is herein referred to as a clock device which is separate from the main part, is capable of setting time but does not include any means for charging secondary batteries. In all these examples, transmission of time data may be by serial transmission or through wireless means.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a block diagram of a portable information device according to an embodiment of this invention to show its system structure;

FIG. 2 is an exploded view of a VTR camera serving as an example of a device shown in FIG. 1;

FIG. 3 is a block diagram of another portable information device according to another embodiment of this invention having a different system structure;

FIGS. 4 and 5 are block diagrams of still other portable information devices according to this invention; and FIGS. 6 and 7 are block diagrams of a portion of FIG. 3 when time data are adapted to be transmitted by serial transmission and through wireless means, respectively.

Throughout herein, components that are substantially the same or similar are indicated by the same numerals for the simplicity of explanation.

DETAILED DESCRIPTION OF THE INVENTION

A portable information system 9 according to this invention, as shown in FIG. 1, comprises what is herein referred to as the main part 1 which is portable and has a clock function, a source part (or a battery pack) 3 which is separable from the main part 1 and serves as its electric power source, and a charger 2 which is provided separate from the main part 1 and serves to charge the source part 3.

Explained more in detail, the main part 1 comprises a control circuit part 1a which includes not only circuits for controlling its operations but also circuits for receiving time information to be described more in detail below, a source control part 1b for receiving a source voltage from the source part 3, supplying it to the main part 1 as a whole and detecting the voltage condition, a memory part 1c comprising a non-volatile memory device for storing various conditions set for the control circuit part 1a, and a display part 1d for displaying data such as the operating condition and time in response to a signal outputted from the control circuit part 1a. The charger 2 comprises a charging control part 2b for controlling the operation for charging the source part 3, a clock part 2a for carrying out clocking and clock setting operations, and a display part 2c for displaying data such as time and the charged condition in response to signals from the clock part 2a or the charging control part 2b. The source part 3 comprises a secondary battery part 3a with a plurality of nickel-hydrogen batteries and a timer part 3b for receiving time information from the clock part 2a of the charger 2 while being supplied with the source voltage of the secondary battery part 3a to continue the clocking operation.

With the system thus structured, the source part 3 is connected first to the charger 2, and the secondary battery part 3a is charged through line L4 by controlling the charging control part 2b. After the secondary battery part 3a has been charged more than enough for operating the timer part 3b, time data in the clock part 3a such as the current time and status data such as the charged condition are transmitted through line L3 to the timer part 3b at least once by a serial transmission process, and the timer part 3b thereafter continues the time-keeping operation on its own. Next, the source part 3 is disconnected from the charger 2 and connected to the main part 1. As the source voltage is supplied to the source control part 1b through line L2, not only does the main part 1 begin to operate but also the time data and the status data which have been updated by the timer part 3b are transmitted by serial transmission through line 1 to the reception circuit of the control circuit part 1a. The control circuit part 1a thereupon serves to continue the clocking and other setting operations based on such time data and also causes these data to be stored in the memory part 1c.

When the voltage of the secondary battery part 3a drops to a level lower than required for the operation of the main part 1 due, for example, to a self-discharge of the secondary battery part 3a or when the secondary battery part 3 has been disconnected from the main part 1, the data in the memory part 1c will continue to be stored but the clocking operation will be stopped. As explained above, however, when a source part 3 with an adequate voltage is attached to the main part 1, time data which have been set correctly by the charger 2 are transmitted to the control circuit part 1a without requiring the user to manually reset the main part 1 such that the main part 1 is ready to function. Even without any backup battery, various data including data on the status of use and time can be transmitted to and stored in the memory part 1c. Thus, there is no need, according to this invention, to provide a backup battery solely for continuing the clocking operation of the main part 1, and the user is not required to keep resetting or updating the time data.

Examples of portable information device which may be structured as shown in FIG. 1 include personal computer notebooks, data communication devices such as what is referred to as personal digital assistants and electronic cameras such as VTR cameras and electronic still cameras. Examples of secondary batteries include rechargeable batteries such as nickel-cadmium cells, lithium ion cells and nickel-hydrogen cells. Examples of a non-volatile memory include semiconductor memories such as FLASH memories, FRAM (ferroelectric memories) and EEPROMs. Examples of data that may be transmitted through the lines L3 and L1 include time data such as current time (including date), charged status and the number of times of recharging. Conditions of operation which may be displayed on the display part 1d of the main part 1 include time data such as date and current time, the mode of operation such as reproduction and recording and the source voltage. The display part 2c of the charger 2 may be adapted to display time data and the charged status.

FIG. 2 shows a VTR camera with a system structure for a portable information device as shown in FIG. 1. The main body 1e of the camera has on its side surface a display part 1f using a liquid crystal. A battery pack 3 serving as the source part is separable from the main body 1e and includes a timer part and a plurality of secondary batteries. Numeral 2d indicates a charger which is separate from the main body 1e and is provided on its upper surface with a liquid crystal display part 2e and a time setting part 2f having switches for manually setting time. The charger 2d is further provided with a plurality of electrodes 2g for charging and data transmission. The battery pack 3 and the main body 1e are also provided with electrodes 3g and 1g, respectively, corresponding to the electrodes 2g on the charger 2d.

If the source part 3 is set at a specified area on the charger 2d as indicated by a two-headed arrow in FIG. 2 and the time setting part 2f is operated to set the time for a clock part, data such as time data are transmitted more than once to the timer part (by a serial transmission process), and the source part 3 begins to carry out the clocking operations after the source voltage of the secondary battery part becomes higher than a specified level because the electrodes 2g and 3g respectively of the charger 2d and the source part 3 are contacting each other to form a closed circuit. If the charged source part 3 is thereafter removed from the charger 2d and installed at a specified part of the main body 1e, the time data are transmitted to the main body 1e, and the main body 1e then begins to carry out the clocking operations since the electrodes 3g and 1g respectively of the source part 3 and the main body 1e are now mutually connected to form a closed circuit. In other words, when the main body 1e is in an operable condition, it is also in the condition to be able to use a correct time based on the time data set by the charger 2d. Since the time setting part 2f is not required to be compact, switches of a reasonable size may be used therefor, making it easier to manually set the time thereon than if it were done on the main body 1e. The charger 2d may be designed to be usable as a clock or a timer when it is not being used to charge the source part 3.

FIG. 3 is a block diagram of another information device 91 for a portable information device according to this invention such as a portable telephone or a car telephone, comprising a main part 11 having a rechargeable secondary battery part 11e and a charger 21 for charging the secondary battery part 11e. The charger 21 and the main part 11 are separate. The main part 11 comprises, in addition to the secondary battery part 11e having secondary batteries for supplying power generally to the main part 11, a control circuit part 11a, a source control part 11b, a display part 11d and a memory part 11c. The control circuit part 11a includes circuits for controlling the operations of the main part 11 and also a circuit for receiving time data. The source control part 11b is adapted to receive power from the secondary battery part 11e and to supply a required source voltage to other circuits and to monitor the source voltage. The display part 11d is for displaying data such as conditions of operations and time in response to a signal from the control circuit part 11a, and the memory part 11c comprises a non-volatile memory device and serves to store data such as conditions of operations through the control circuit part 11a. The charger 21 is structured similarly to the charger 2 shown in FIG. 1, comprising a charging control part 21b for controlling the charging of the secondary battery part 11e, a clock part 21a which has functions of a clock and a calendar and is also adapted to set time and a display part 21c for displaying time and other data in response to a signal from the clock part 21a.

When the charger 21 is attached to the main part 11, the secondary battery part 11e is charged through line L6 under the control of the charging control part 21b. After the secondary battery part 11e has been charged to a specified level, time data are transmitted from the clock part 21a at least once through serial transmission to the control circuit part 11a through line L5 such that the control circuit part 11a can thereafter carry out clocking operations on the basis of the received clock data.

When the voltage of the secondary battery part 11e drops to a level lower than required for the operation of the main part 4 due, for example, to a long-time use of the main part 11 or a self-discharge of the secondary battery part 11e, the data in the memory part 11c will continue to be stored but the clocking operation will be stopped.

As variations of the examples described above, what may be herein referred to as "the clock device", obtained by removing the charging control part 2b or 21b from the charger 2 or 21, may be used for certain applications, still providing time-setting and display functions separate from the main part 1 or 11. For example, FIG. 4 shows still another information device 92 by using the same symbols as used in FIG. 1 for those of the components which are the same as, or substantially like, those already described above. The device 92 according to this embodiment of the invention is characterized as using a clock device 22 comprising a clock part 22a and a display part 22c but not having an equivalent of the charging control part 2b shown in and described in connection with FIG. 1. Accordingly, its charger 32, structured substantially like the charger 3 shown in FIG. 1, is described as comprising a timer part 32b and a primary battery part 32a with a plurality of primary batteries.

Similarly, FIG. 5 shows still another information device 93 which is different from the device 91 shown in FIG. 3 in that the clock device 22 (as shown in FIG. 4 and described above) is substituted for the charger 21 of FIG. 2, and hence its main part 13 is described as comprising, in addition to a control circuit part 13a, a source control part 13b, a memory part 13c and a display part 13d, a primary battery part 13e (rather than a secondary battery part). It is thus to be noted, in summary, that the information devices according to this invention are characterized as requiring no backup batteries.

Although the invention has been described above by way of only a limited number of embodiments, these examples are not intended to limit the scope of the invention. Many modifications and variations are possible within the scope of this invention. For example, transmission of various data including time data may be carried out by any known means. FIG. 6 shows more in detail a portion of FIG. 3 related to the transmission of data between the clock part 21a of the control circuit part 11a of the main part 11 through a serial transmission method, by means of serial input/output interfaces 21d and 11f provided respectively to the charger 21 and the main part 11. As another example, FIG. 7 shows more in detail the same portion of FIG. 3 when the data transmission is effected through wireless means (or through radio signals), transceivers 21d' and 11f' of a known kind being provided respectively to the charger 21 and the main part 11.

Instead of display devices, means for announcing the time by voice may be used. Connectors may be used instead of electrodes and power transmission may be effected through electromagnetic waves. Instead of liquid crystal display devices, light emitting diodes and FL tubes may be substituted. A prior art circuit may be used for the clock part, and a known oscillator circuit using a crystal or ceramic oscillator may be used. A magnetic memory device such as HDD and FDD may be used instead of a semiconductor memory device without changing the system structure. Any control method such as by temperature and time may be used for controlling the charging by a charger.

The system structure need not be modified to transmit data of many other kinds. Some additional kinds of data may be set somewhere other than the main part and transmitted to the main part. In summary, the disclosure given above is intended to be interpreted broadly.

What is claimed is:

1. A portable information device comprising:
   a portable main part having a clocking function;
   a source part which is detachably attachable to said main part and contains secondary batteries serving as a power source for said main part; and
   a charger which is separate from said main part and serves to charge said source part, said charger including a clock part for setting time, said information device being adapted to transmit time data from said clock part to said source part when said source part is charged by said charger, said information device being further adapted, when said source part is attached to said main part, to cause time data updated by said source part to be transmitted to said main part and to thereafter cause said main part to continue updating said time data.

2. The portable information device of claim 1 wherein said main part includes a non-volatile semiconductor memory device, said clocking function ceasing to function when said source part experiences a voltage drop or is removed from said main part such that said main part stops being able to function.

3. A portable information device comprising:
   a portable main part with a clocking function, containing a source part having rechargeable secondary batteries; and
   a charger which is separate from said main part and serves to charge said source part, said charger including a clock part for setting time, said information device being adapted to cause time data from said clock part to be transmitted to said main part when said source part in said main part is charged by said charger, and to thereafter cause said main part to continue updating said time data.

4. The portable information device of claim 3 wherein said main part includes a non-volatile semiconductor memory device, said clocking function ceasing to function when said source part experiences a voltage drop such that said main part stops being able to function.

5. A portable information device comprising:
   a portable main part with a clocking function;
   a source part which is detachably attachable to said main part and contains primary batteries serving as a power source for said main part; and a clock device which is separate from said main part and is capable of setting time, said information device being adapted to cause time data from said clock device to be transmitted through said source part to said main part and to thereafter cause said main part to continue updating said time data.

6. The portable information device of claim 5 wherein said main part includes a non-volatile semiconductor memory device, said clocking function ceasing to function when said source part experiences a voltage drop or is removed from said main part such that said main part stops being able to function.

7. A portable information device comprising:

a portable main part with a clocking function, said main part including a clocking control part and a source part, said source part serving as a power source for said clocking function but not containing any backup batteries for said power source; and a clock device which is separate from said main part and includes a clock device for setting time, said clocking control part serving to receive clock data from said clock device at least once after said source part is charged to a specified level and to thereafter carry out said clocking function based on the received clock data.

8. The portable information device of claim 7 wherein said main part includes a non-volatile semiconductor memory device, said clocking function ceasing to function when said source part experiences a voltage drop such that said main part stops being able to function.

9. A charger for charging a source part of a portable main part of an information device having a clocking function and being separate from said main part and provided with rechargeable secondary batteries, said charger comprising:

a clock part for setting time; and a signal transmitting circuit for transmitting time data from said clock part to said main part and thereafter causing said main part to keep updating said time data.

10. The charger of claim 9 wherein said time data are transmitted from said clock part to said main part directly without passing through said source part and said signal transmitting circuit is adapted to transmit said time data by serial transmission.

11. The charger of claim 9 wherein said time data are transmitted from said clock part to said main part directly without passing through said source part and said signal transmitting circuit in adapted to transmit said time data through wireless means.

12. The charger of claim 9 wherein said time data are transmitted from said clock part to said main part through said source part and said signal transmitting circuit in adapted to transmit said time data by serial transmission.

13. The charger of claim 9 wherein said time data are transmitted from said clock part to said main part through said source part and said signal transmitting circuit in adapted to transmit said time data through wireless means.

14. A clock device which is separate from a portable information device having a clocking function, said clock device comprising:

a clock part for setting time; and a signal transmitting circuit for transmitting time data by serial transmission from said clock part to said information device and thereafter causing said information device to keep updating said time data.

15. The clock device of claim 14 wherein said signal transmitting circuit in adapted to transmit said time data through wireless means.

* * * * *